United States Patent [19]

Cornax

[11] Patent Number: 5,226,288
[45] Date of Patent: Jul. 13, 1993

[54] TORQUE LINK FAN JET ENGINE SUPPORT FOR REDUCING ENGINE BENDING

[75] Inventor: Dennis Cornax, Chula Vista, Calif.
[73] Assignee: Rohr, Inc., Chula Vista, Calif.
[21] Appl. No.: 719,255
[22] Filed: Jun. 21, 1991
[51] Int. Cl.$^5$ ............................................. F02K 3/02
[52] U.S. Cl. .................................. 60/226.1; 60/39.31
[58] Field of Search ................ 60/39.31, 39.32, 226.1; 415/134, 138

[56] References Cited

U.S. PATENT DOCUMENTS

| 4,474,001 | 10/1984 | Griffin et al. | 60/226.1 |
| 4,696,619 | 9/1987 | Lardellier | 60/39.32 |

FOREIGN PATENT DOCUMENTS 2013786 8/1979 United Kingdom ............... 60/39.31

*Primary Examiner*—Richard A. Bertsch
*Assistant Examiner*—William Wicker
*Attorney, Agent, or Firm*—Patrick J. Schlesinger; Frank D. Gilliam

[57] ABSTRACT

A support system for the aft end of fan jet gas turbine engines which reduces engine bending in operation while accommodating radial and longitudinal thermal expansion forces. A plurality of inwardly extending small flanges are provided on a first ring, which may form part of the engine core cowl, that is secured to the pylon supporting the overall engine. A plurality of outwardly extending small flanges are provided on a second ring, which is secured to, or otherwise forms a part of, the engine. These flanges are spaced in adjacent pairs, one on each ring. Torque links are connected between these pairs of flanges. The torque links support the engine aft end against bending and flexing forces while accommodating thermal expansion forces.

6 Claims, 2 Drawing Sheets

TORQUE LINK FAN JET ENGINE SUPPORT FOR REDUCING ENGINE BENDING

BACKGROUND OF THE INVENTION

This invention relates in general to fan jet gas turbine engines and, more specifically, to a load sharing support arrangement for supporting the aft engine of the engine against bending forces.

In conventional fan jet engines of the sort used in large commercial aircraft, the engine cowling is supported within the engine nacelle near the front through an annular array of struts. Since the engine is relatively narrow and "wasp waisted", it is subject to bending and flexing in operation causing a number of problems, such as metal fatigue, fastener loosening, etc. Also, these movements can lead to increased turbine blade clearances and lower engine efficiency resulting in lower fuel efficiency.

Attempts have been made to reduce bending and flexing by adding support near the aft end of the engine. Such supports have a number of problems accommodating the radial and longitudinal thermal expansion of the engine during operation. Prior supports tend to be heavy and complex, adding fuel consuming weight to the aircraft and adding opportunity for errors in mounting the engine and potential for failures in operation.

Typical of these proposed aft engine supports is the complex system of annular teeth and grooves with radial pins and ball joints described by Naud in U.S. Pat. No. 4,683,717 and the complex system described by Pachomoff et al in U.S. Pat. No. 4,742,975 which requires the addition of safety rods to protect against failure of the support system.

Thus, there is a continuing need for an engine support system which is simple, light weight and accommodates radial and longitudinal engine thermal expansion during use.

SUMMARY OF THE INVENTION

It is, therefor, an object of this invention to provide an engine support system overcoming the above-noted problems. Another object is to provide an engine support of improved simplicity and reliability. A further object is to provide a light weight and effective engine support system. Still another object is to provide an engine support system that can accommodate radial and longitudinal thermal expansion in an engine during operation.

The above objects, and others, are accomplished in accordance with this invention, basically, by a support system for the aft end of the engine core in a fan jet type gas turbine engine that comprises a first ring surrounding the aft portion of the engine, forming part of the engine cowl, and an adjacent second ring surrounding the engine and secured to or forming part of the engine, with cooperating pairs of inwardly and outwardly extending flanges on the first and second rings, respectively, and torque links extending between the pairs of flanges. The first ring is secured to the pylon or other means that mounts the entire engine assembly onto the aircraft.

Preferably, the torque links are installed in sets of two, with the inwardly extending flanges on the first ring arranged with two flanges together or as a single wider flange, with two torque links extending in opposite directions to two spaced flanges on the second ring, so that no rotational forces are imposed on the second ring and engine during engine thermal expansion as the engine heats up upon initiation of operation.

Depending upon engine design, the first and second rings may be separate rings secured to the core cowl and engine, respectively, or may be ring-shaped portions of the cowl and engine designed to be located in the desired proximity to each other. Generally, designing the engine to have suitable portions of cowl and engine to act as the rings will save weight. While the primary emphasis is on engines for use in aircraft, the support system, of course, has utility in other fan type gas turbine engine applications, such as power sources for electrical generating plants and the like.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
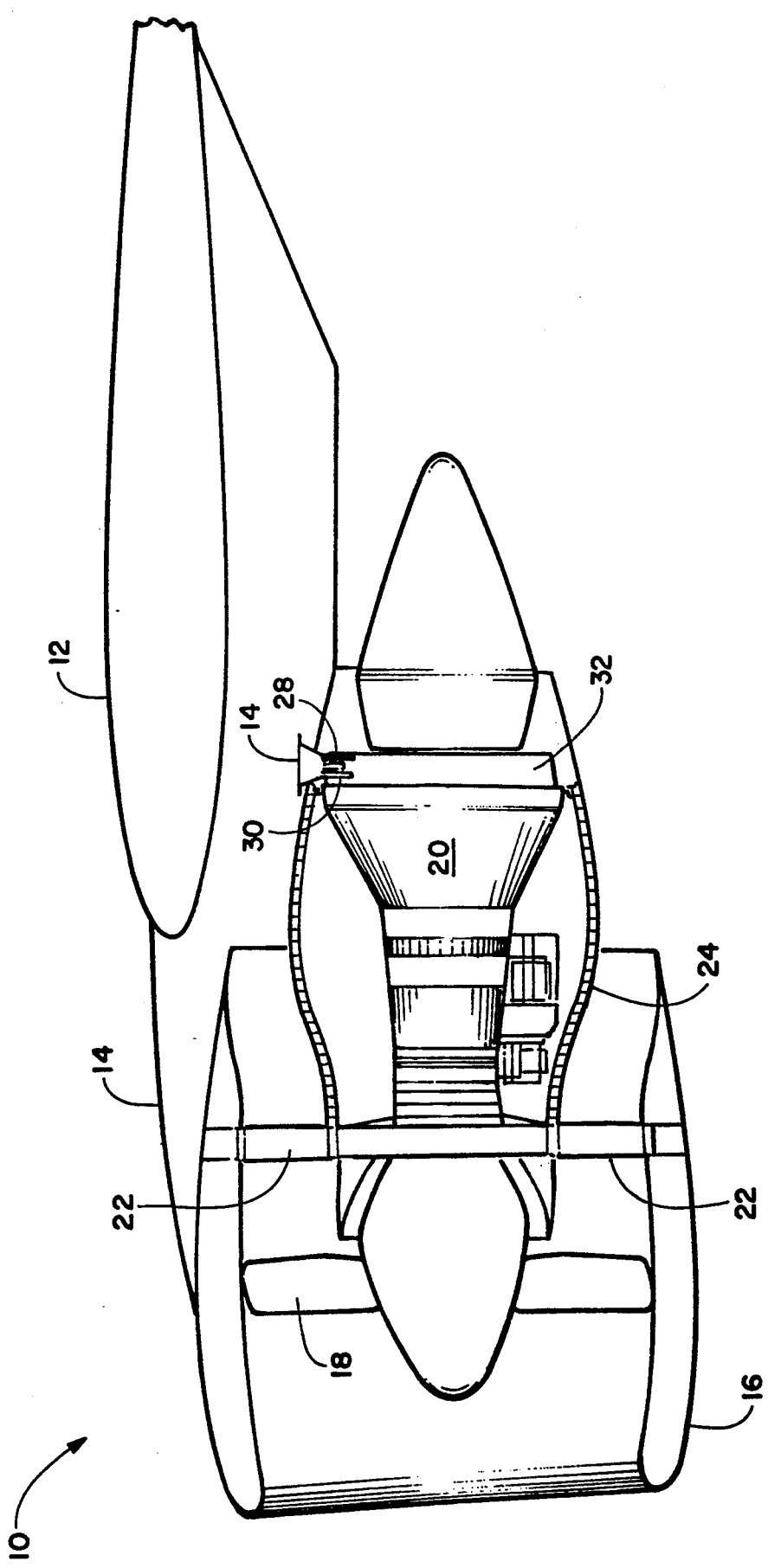
FIG. 1 is a partially cut-away schematic side elevation view of an engine using the aft engine support of this invention.

Referring now to FIG. 1, there is seen a schematic side view of a fan type aircraft gas turbine engine 10 mounted on a wing 12 by a pylon 14. The engine nacelle 16 within which fan blades 18 rotate is secured to pylon 14. Engine core 20 is enclosed in core cowl which is mounted at its forward end to engine forward core hub frame 22. As can be seen, engine core 20 is relatively narrow in the central portion and susceptible to bending or flexing when varying loads are imposed thereon.

Figure 2:
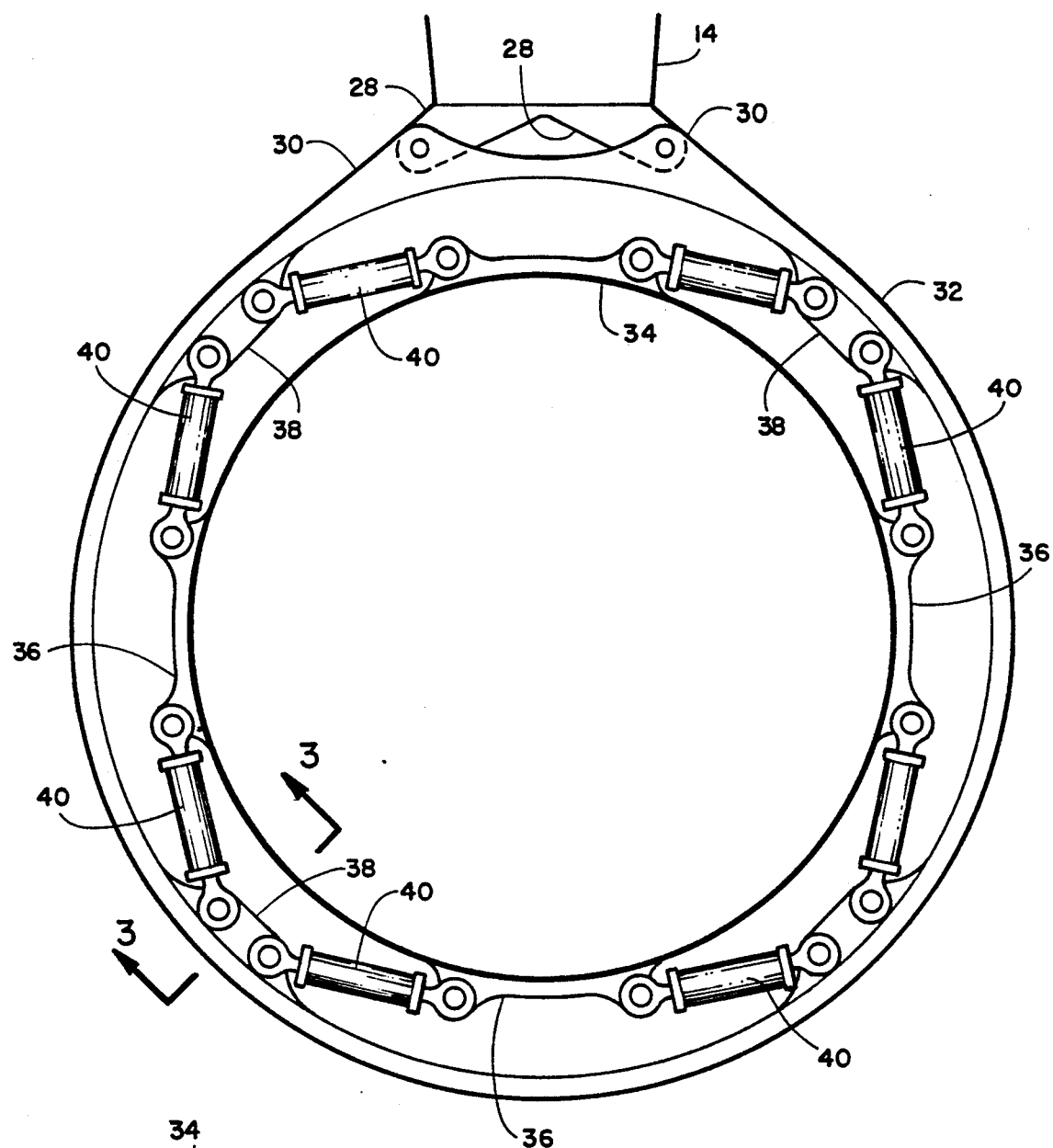
FIG. 2 is a schematic section view taken on line 2—2 in FIG. 1.
Figure 3:
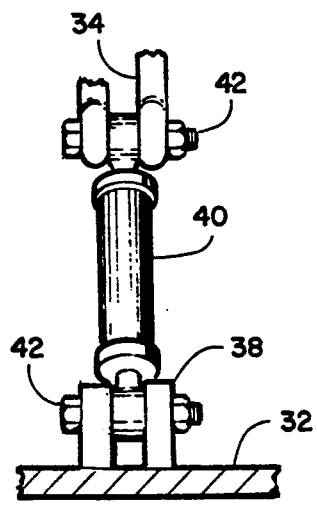
FIG. 3 is a schematic detail section view taken on line 3—3 in FIG. 2.

The aft end of core cowl 24 is supported by an attachment plate 28 fastened to pylon 14 as seen in FIGS. 1 and 2. As seen in FIGS. 2 and 3, plate 28 is bifurcated with two rounded ends that are overlapped by flanges 30 on core cowl ring 32. Ring 32 is fastened to cowl 24 around its circumference.

A second ring 34 is positioned within cowl ring 32 and is secured to engine 20 around its circumference. A plurality of cooperating pairs or sets of outwardly extending flanges 36 on second ring 34 and outwardly extending flanges 38 on cowl ring 32 are provided around the circumference of the rings. Torque links 40 are secured, such as by conventional bolts 42, between adjacent flanges 36 and 38. Preferably each outwardly extending flange 38 mounts two oppositely extending torque links 40 to avoid imposing rotational forces on second ring 34 during engine temperature changes. Of course, flanges 38 could be separate closely spaced flanges or, for example, two torque links 40 could extend in one direction, then two in the opposite direction, etc., to produce balanced forces.

Torque links 40 can accommodate both radial and longitudinal forces between rings 32 and 34 during temperature changes as the engine heats up when turned on and cools down when turned off. Any suitable torque links may be used, such as adjustable tie bars with spherical bearing rod ends.

Other applications, variations and ramifications of this invention will occur to those skilled in the art upon reading this disclosure. Those are intended to be included within the scope of this invention, as defined in the appended claims.

I claim:

1. In a fan jet type gas turbine engine having an engine nacelle secured to an aircraft pylon, an engine core within said nacelle housed in a structural core cowl and secured at its forward end to said pylon, the improvement comprising:

a substantially fully annular core cowl ring forming part of the core cowl and surrounding the aft end of the engine core and positioned transverse to the engine's longitudinal centerline;

mount means securing said cowl ring to the engine pylon near the aft end of the core cowl;

a plurality of circumferentially arranged inwardly extending flanges positioned on said cowl ring;

a substantially fully annular second ring positioned concentrically and within said cowl ring and secured to the engine core;

a plurality of circumferentially arranged outwardly extending flanges on said second ring;

said inwardly extending flanges and outwardly extending flanges arranged in spaced apart pairs radially around said engine; and a plurality of links, each link secured between adjacent pairs of said inwardly and outwardly extending flanges;

whereby said aft end of said engine is supported only by the link connections between the core cowl ring and the engine core ring and said links accommodate relative radial and longitudinal thermal expansion of said rings to share engine loads with the core cowl and thereby reduce bending of the engine core.

2. The improvement according to claim 1 wherein each sequential pair of links around said rings have two adjacent ends secured to said cowl ring flanges.

3. The improvement system according to claim 2 wherein four pairs of said links are substantially uniformly arranged around the circumference of said rings.

4. A load sharing support arrangement for reducing bending of the engine core in a fan jet gas turbine engine in which the forward end of the core of the engine is mounted to the forward part of a pylon attached to the wing of an aircraft, which comprises:

a substantially fully annular first ring adapted to surround the aft portion of a fan jet engine and to form part of a core cowl surrounding the engine core;

mount means for securing said first ring to a pylon mounted on an aircraft;

a second ring adapted to surround and attach to the aft portion of said fan jet engine;

said first ring being provided with a plurality of circumferentially arranged and radially inwardly extending flanges;

said second ring being provided with a plurality of circumferentially arranged and radially outwardly extending flanges;

said inwardly extending flanges and outwardly extending flanges arranged around said rings in adjacent spaced apart pairs; and a plurality of links for accommodating relative radial and longitudinal thermal expansion of said rings, each link secured between adjacent pairs of said inwardly and outwardly extending flanges;

whereby said aft end of said engine is supported only by the connection of the links between the first and second rings and said links accommodate relative radial and longitudinal thermal expansion of said rings to reduce bending of the engine core in flight operation.

5. The load sharing support system according to claim 1 wherein each sequential pair of links around said rings have ends secured to said first ring flanges and the opposite ends of said links extending inwardly to said second ring flanges.

6. The load sharing support system according to claim 5 wherein four pairs of said links are substantially uniformly arranged around the circumference of said rings.

* * * * *